United States Patent [19]

Allart et al.

[11] Patent Number: 5,220,854

[45] Date of Patent: Jun. 22, 1993

[54] MECHANISM CASING PROVIDED WITH PARTICULAR VENTING DEVICES

[75] Inventors: Bernard Allart, Crepy en Valois; Alain Noel, Villeneuve/Verberie, both of France

[73] Assignee: Poclain Hydraulics, Verberie, France

[21] Appl. No.: 816,382

[22] Filed: Dec. 27, 1991

[51] Int. Cl.$^5$ ............................ F16H 57/02; F16D 1/00
[52] U.S. Cl. ................................ 74/606 R; 403/408.1; 403/337; 411/915
[58] Field of Search .................... 74/606 R, 606 A; 403/408.1, 337; 411/915, 542, 546; 285/901

[56] References Cited

U.S. PATENT DOCUMENTS

| | | | |
|---|---|---|---|
| 2,422,597 | 6/1947 | Stewart | 411/915 X |
| 2,688,497 | 9/1954 | Brisack | 411/915 X |
| 3,955,654 | 5/1976 | Lemonnier | 403/337 X |
| 4,492,817 | 1/1985 | Selby | 411/915 |
| 4,643,044 | 2/1987 | Bitton | 74/606 R |
| 4,667,628 | 5/1987 | Lopex-Crevillen | 123/195 C |
| 4,929,137 | 5/1990 | Bossenmaier | 403/408.1 |
| 5,090,868 | 2/1992 | Mosure et al. | 403/337 |
| 5,129,447 | 7/1992 | Hamner | 403/408.1 |

FOREIGN PATENT DOCUMENTS

| | | |
|---|---|---|
| 0161171 | 11/1985 | European Pat. Off. . |
| 0191674 | 8/1986 | European Pat. Off. .......... 74/606 R |
| 3903780 | 8/1990 | Fed. Rep. of Germany ...... 411/915 |
| 1145423 | 3/1969 | United Kingdom . |

*Primary Examiner*—Vinh T. Luong

[57] ABSTRACT

A mechanism casing for a hydraulic motor comprises a casing body having a face for application of a lid. The lid is applied tightly on the casing body face and fastened to the casing body by screws via screwheads thereof tightened against an outer face of the lid. The screws pass through the lid via screw passages with circumferential clearance between the screws and screw passages. An O-ring is interposed between the casing body and the lid. At least one of the screw passages are conduit screw passages which open out within a perimeter defined by the O-ring. The conduit screw passages open out into cavities formed in one of either the casing body or the lid, and through which cavities the conduit screw passages permanently communicate with the enclosure defined by the casing. When the screwheads are in an untightened position with respect to the outer face of the lid, fluid communication is effected between said enclosure and the outside of the mechanism casing by way of fluid conduits, which comprise one of the cavities and one of the conduit screw passages.

7 Claims, 2 Drawing Sheets

MECHANISM CASING PROVIDED WITH PARTICULAR VENTING DEVICES

FIELD OF THE INVENTION

The present invention relates to a mechanism casing provided with particular venting devices.

BACKGROUND OF THE INVENTION

Numerous hydraulic mechanisms comprise a casing which defines an enclosure capable of containing a hydraulic fluid, but which, initially, at the moment of assembly, contains air which must be evacuated before the mechanism is first put into operation. This is usually effected by providing a plurality of vent screws so that, whatever the assembly of fit of the mechanism on the receiving structure, at least one vent screw will be in operational position. Each vent screw is expensive and the large number of such screws contributes to increasing the manufacturing cost of the mechanisms.

It is an object of the invention to propose a novel arrangement which, by eliminating the special vent screws, overcomes the drawback set forth hereinabove.

SUMMARY OF THE INVENTION

The invention therefore relates to a mechanism casing defining an enclosure and comprising: a casing body presenting a face for application of a lid; a lid for closing the casing applied tightly on said face of application of the casing body and fastened to this body by means of screws, which pass through the lid with clearance via screw passages and of which the screw heads are capable of being applied tightly on an outer face that the lid presents; and an O-ring interposed between said body and lid.

According to the invention: a) at least one of said screw passages opens out within the perimeter defined by the O-ring; and b) the passages of the screws located within said perimeter defined by the O-ring open out into cavities which are made in one of the two elements—casing lid and body—and which permanently communicate with said enclosure, with the result that, before the tight application of the screw heads, corresponding to said screw passages located within said perimeter defined by the O-ring on the outer face of the lid, fluid conduits, each comprising one of said cavities and one of said screw passages, effect communication of said enclosure with the outside of the casing.

The following advantageous arrangements are also preferably adopted:
the cavities are made in the lid;
the cavities are localized;
the cavities are constituted by counter-sinkings in the bearing face of the lid in which these cavities are made;
all the screw passages open out within the perimeter defined by the O-ring;
either the screw heads capable of being applied tightly on the outer face of the lid are applied directly without the interposition of seals;
or the screw heads capable of being applied tightly on the outer face of the lid are applied via seals interposed between each screw head and the lid.

The principal advantage of these arrangements resides in the elimination of the special vent screws, which were heretofore compulsory to adopt. Such elimination results in a lightening, a lower cost and a simplification of the corresponding mechanisms.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
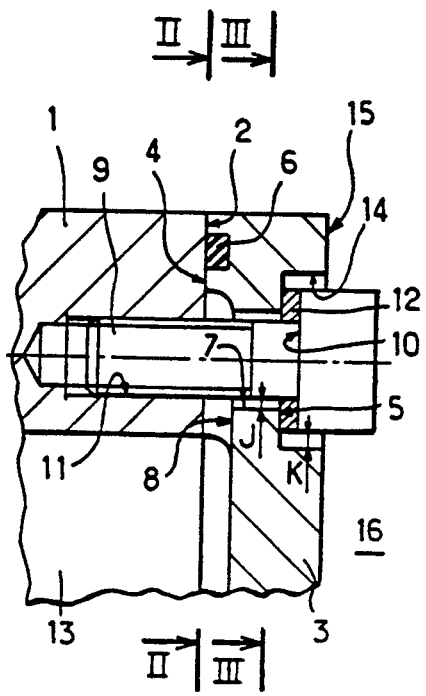
FIG. 1 is a partial axial section through a hydraulic motor presenting a casing in accordance with a first embodiment of the invention, along I—I of FIG. 2, in a first operational configuration.
Figure 2:
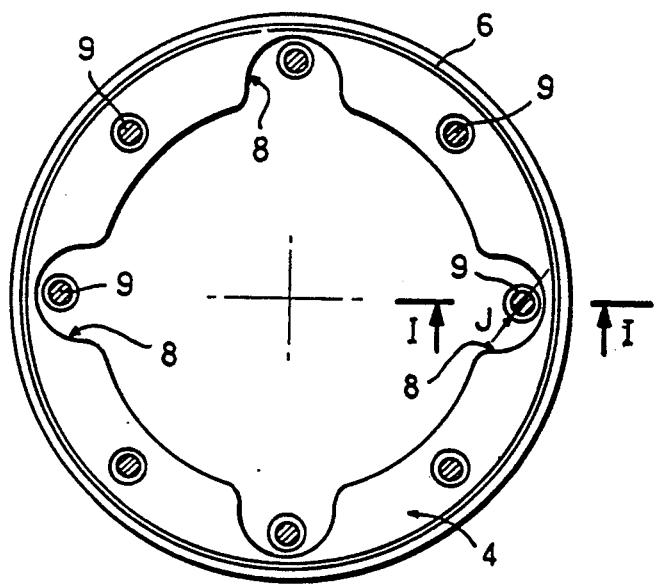
FIGS. 2 and 3 are sections along II—II and III—III, respectively, of FIG. 1.
Figure 3:
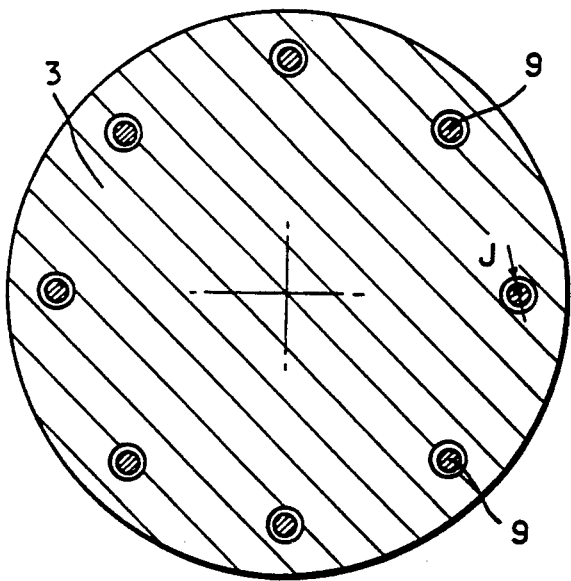

Referring now to the drawings, the casing shown in FIGS. 1 to 3 is that of a hydraulic motor such as, for example, shown in EP-A-0 191 674. The constitution of such a motor is well known and, as it does not form the subject matter of the present Patent Application, it does not require to be described again in detail.

The casing comprises:
a casing body 1 which comprises a flat face 2;
a lid 3 for closing the casing, which comprises a flat, inner, peripheral face 4 for application on the flat face 2 of the casing body 1, and an outer face presenting locations 5 for screw heads to bear;
an O-ring 6 disposed between the flat face 2 of the casing body and flat face 4 of the lid;
screw passages 7 made in the lid 3, passing therethrough in the zones of said locations 5, certain of these passages opening out in the inner face of the lid, into cavities 8, or more generally, in zones where the inner face of the lid is recessed with respect to the flat face 4;
screws 9, provided with screw heads 10, which pass through the screw passages 7 and cooperate with tappings 11 made in the casing body 1 in order to secure the lid 3 on the casing body;
seals 12 interposed between each screw head 10 and the corresponding bearing location 5.

In the embodiment shown, only one screw passage 7 out of two opens out into a cavity 8, the other screw passages opening out in the flat peripheral face 4 itself of the lid 3.

The following particular features may additionally be observed:
the securing of the lid 3 on the casing body 1 defines within said casing body an enclosure 13 capable of containing, when the motor functions, hydraulic fluid and, initially, before the motor is first put into operation, air;
a clearance J is arranged between each screw 9 and the screw passage 7;
when the locations 5 for the screw heads to bear on constitute the bottom of small cavities 14 opening out in the outer face 15 of the lid, clearances K are arranged between the screw heads 10 and the lateral walls of said cavities 14;

it should be noted that, in a variant, the locations 5 for screw heads to bear on may be contained in the outer face 15 of the lid and that, in that case, the small cavities 14 would no longer exist;

as has already been suggested, the counter-sinkings 8 would constitute cavities for communication of the screw passages 7 with the enclosure 13, may be replaced in this function by other passages which are not necessarily counter-sinkings;

likewise in a variant, the counter-sinkings 8 may be made in the casing body 1 and open out in its flat face 2;

these counter-sinkings 8, or, more generally, these cavities in which the screw passages 7 open out, do not extend over the whole of the flat face 4 of the lid 3, but are each situated in a limited location of this face 4, which makes it possible to conserve a satisfactory bearing of the lid 3 on the flat face 2 of the casing 1 and to obtain a satisfactory quality of assembly of these two parts;

as shown in FIG. 2, the O-ring 6 defines a perimeter within which all the screw passages 7 open out, with the result that the clearances J of the screw passages 7 which open out into counter-sinkings 8 communicate with the enclosure 13.

In the configuration of FIG. 1, the screw heads 10 are in tight abutment on the seals 12 and place these seals themselves in tight abutment on the locations 5 of lid 3.

Figure 4:
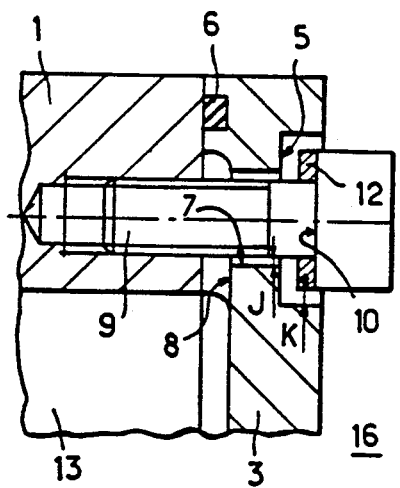
FIG. 4 is an axial section, similar to that of FIG. 1, of the same motor, but corresponding to a second operational configuration.

In the configuration of FIG. 4, certain of the screw heads 10, which correspond to the screws traversing screw passages 7 opening out in counter-sinkings 8, are not in (tight) abutment on seals 12, the latter themselves not being in (tight) abutment on locations 5.

In this way, conduits, each constituted by a counter-sinking 8, a clearance J, the space included between a seal 12 and the screw head 10 and/or the corresponding location 5, and the clearance K, effect communication of the inner enclosure 13 with the outer space 16 which surrounds the motor.

Figure 5:
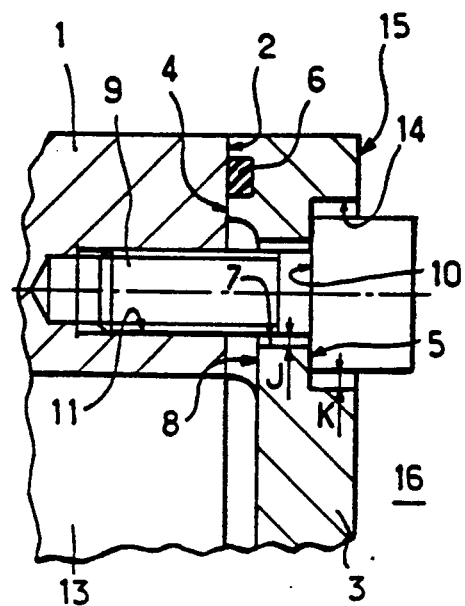
FIGS. 5 and 6 are sections, respectively similar to those of FIGS. 1 and 4, of a hydraulic motor casing in accordance with a second embodiment of the invention, said sections corresponding to the two operational configurations of this casing.
Figure 6:
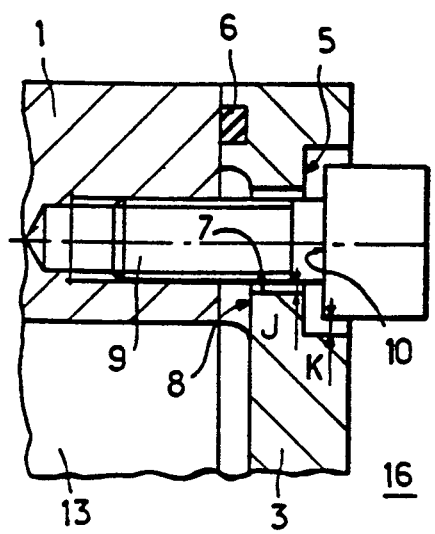

The embodiment of FIGS. 5 and 6 is identical to that of FIGS. 1 and 4, except for the elimination of seals 12, tightness, in the configuration of FIG. 5, being provided by direct abutment of the screw head 10 on the corresponding location 5 of the lid 3. The explanation of the functioning of the venting device illustrated with regard to FIGS. 1 to 4, which will be given hereinafter, therefore remains valid for the variant of FIGS. 5 and 6.

When the motor is first put into operation, after having been manufactured, the enclosure 13 contains air which was imprisoned inside the enclosure during the tight securing of the lid 3 on the casing body 1, and begins to fill with hydraulic fluid. In order to ensure satisfactory functioning of the motor, it is necessary to evacuate from the enclosure 13 the air that it contains. To effect this evacuation of the air, it suffices to place in the configuration of FIG. 4 (or FIG. 6) one or more of screws 9 which pass through those screw passages 7 opening out in counter-sinkings 8 and which are disposed in the upper part of the motor in the position that it then occupies, in order to allow the air to escape through the communication conduit thus formed (8-J-K). During this operation, the screw heads 10 of the other screws (those corresponding to screw passages 7 not opening out in counter-sinkings 8) should be maintained tightened on their locations 5 in order to maintain the lid 3 and the casing 1 assembled. After this operation of venting of the motor, retightening of the screws until tightness is obtained between the screw heads 10, the seals 12 and the locations 5 (FIG. 1) or, directly between the screw heads 10 and the locations 5 (FIG. 5), again makes it possible to obtain a tight assembly of the lid 3 and the casing body 1 and to insulate the inner enclosure 13 from the outer space 16.

The arrangements described are advantageous, as:

the screws 9 used here for venting the mechanism are not added to the mechanism: they are normal screws for securing the lid 3 on the casing body 1;

these screws 9 are not fragile, which is not always the case of conventional venting screws;

the locations which had to be provided heretofore for placing the venting screws, are now freed, which facilitates the design of the mechanism;

the space requirement of the conventional venting screws and the cost thereof are eliminated, which is, of course, always sought after.

The arrangements which have just been described are applicable to the casings of all hydraulic mechanisms from which the air that they contain must be evacuated.

The invention is not limited to the embodiments shown, but covers, on the contrary, the variants which may be made thereto without departing from the scope nor spirit thereof.

What is claimed is:

1. A mechanism casing defining an enclosure, the casing comprising:

a casing body presenting a face for application of a lid for closing the casing body;

the lid applied tightly on the casing body face and fastened to the casing body by screws via screw-heads thereof tightened against an outer face of the lid, which screws pass through the lid via screw passages, there being circumferential clearance between the screws and screw passages; and an O-ring interposed between the casing body and the lid;

wherein (a) at least one of said screw passages are conduit screw passages which open out within a perimeter defined by the O-ring, and (b) the conduit screw passages open out into cavities formed in one of either the casing body or the lid, and through which cavities the conduit screw passages permanently communicate with said enclosure, whereby, when the screwheads are in an untightened position with respect to the outer face of the lid, fluid communication is effected between said enclosure and the outside of the mechanism casing by way of fluid conduits, each comprising one of said cavities and one of said conduit screw passages.

2. The casing of claim 1, wherein the cavities are formed in the lid.

3. The casing of claim 1, wherein the cavities are localized.

4. The casing of claim 1, wherein the cavities are constituted by counter-sinkings in the face of the lid applied to the casing body face.

5. The casing of claim 1, wherein all the screw passages open out within the perimeter defined by the O-ring.

6. The casing of claim 1, wherein the screw heads are tightened directly against the outer face without the interposition of seals.

7. The casing of claim 1, wherein the screw heads are tightened via seals interposed between each screw head and the lid.

* * * * *

UNITED STATES PATENT AND TRADEMARK OFFICE
CERTIFICATE OF CORRECTION

PATENT NO. : 5,220,854

DATED : June 22, 1993

INVENTOR(S) : Bernard Allart and Alain Noel

It is certified that error appears in the above-indentified patent and that said Letters Patent is hereby corrected as shown below:

On the title page, insert the following information:

[30] Foreign Application Priority Data
Jan. 10, 1991 [FR] France................91 00251

Signed and Sealed this

Seventeenth Day of January, 1995

Attest:

BRUCE LEHMAN

*Attesting Officer*     *Commissioner of Patents and Trademarks*